UNITED STATES PATENT OFFICE.

JOHN T. SLOUGH, OF WOODSTOCK, CANADA.

ADHESIVE CEMENT.

SPECIFICATION forming part of Letters Patent No. 709,651, dated September 23, 1902.

Application filed February 17, 1902. Serial No. 94,494. (No specimens.)

*To all whom it may concern:*

Be it known that I, JOHN T. SLOUGH, cheesemaker, of the city of Woodstock, in the county of Oxford and Province of Ontario, Canada, have invented a certain new and useful composition of matter to be used in the manufacture of furniture and veneer-work and other articles in which glue or cement is used in the making or fastening together; and I do hereby declare that the following is a full, clear, and exact description of the same.

The nature of my invention consists of treating or combining with sixteen parts, by weight, of casein or skim-milk cheese from one-half to one and one-half parts of alkali, preferably pure, (caustic soda,) an article which dissolves the casein or renders it soluble when mixed thoroughly with from thirty-six to sixty-five parts of pure water and heating at a temperature of from 150° to 212° Fahrenheit, to which solution or composition of casein and solvent two parts of neutralized infusible oxid, preferably oxid of magnesia, are added or have been added, the oxid being productive of greater adhesiveness and causing the casein solution to set and harden in a short time after it is applied to a surface or between jointed surfaces that are to be held together. When the above articles have been either separately or combinedly mixed together and heated at the temperature of from 150° to 212° in a double boiler until a particle taken from the boiler upon the finger will string between the thumb and forefinger, it is ready for use. The composition must be kept near boiling-point as long as there is a tendency for the casein to become thick in cooling, after which the temperature may be lowered. The right proportion of water (thirty-six or more parts) must be kept in boiler at all times. The proportion of water is governed by the proportion of alkali used. The casein is most perfectly dissolved with upward of one and one-half parts of alkali and is thinly fluid with thirty-six parts of boiling water, whereas with one-half part of alkali and about sixty-four parts of boiling water the casein would not be so thoroughly dissolved, but of sufficiently fluid for use and possesses the following advantages: It resists moisture and heat, is practically damp and heat proof, and covers more surface.

The casein or skim-milk cheese as used in my composition is produced by separator-creameries or butter-factories. The skim-milk as it comes from the separator at a temperature of about 90° is curdled by adding from two to four ounces of rennet extract to each one thousand pounds of skim-milk. If skim-milk is nearly sour when rennet extract is added, the smallest proportion—two ounces—of rennet extract will be sufficient, the idea being to have the milk curded firmly, that it may be cut into small tubes or curds, further heated to a temperature of about 100°, curds kept in agitation until but sufficient moisture is retained in the particles after whey is run off, that they will mat together when put into regular cheese-press, and pressed about twelve hours. Cheese or curd is then taken from the press, broken up and ground, or the matter-pressed curds or cheese triturated by a cylindrical grater, or the curds may be cooked at a temperature of about 150°, kept separate by agitation until they become hard, after which the whey is run off, the curds put in a dry airy place, preferably over racks, where they are kept in separate particles, when they are ground. In either case lactic acid should have developed sufficiently in whey before it is run off that it is discernible in the curd by a particle of curd stringing from a hot iron. The alkali (caustic soda) as used according to my invention is preferably commercially or chemically pure. The neutralized infusible oxid, preferably oxid of magnesia, is the commericial article.

I am aware that suggestions have been made as to how casein or skim-milk cheese could be combined with wood-ashes and lime as a cement; but these have not met with practical success. I therefore do not claim to be the discoverer of casein as containing adhesive properties, but claim to be the inventor of this the only practical composition of casein glue or cement which is made with an alkali, preferably pure, (caustic soda,) and neutralized infusible oxid, preferably oxid of magnesia; nor would I be understood as including with this application for a patent the process for preparing the casein.

What I claim as my invention, and desire to secure by Letters Patent, is—

1. The herein-described composition of matter consisting of casein, combined with an alkali, infusible oxid, free from acidity or alkalinity, preferably oxid of magnesia, and boiling water.

2. The herein-described composition of matter for casein glue or cement, consisting of casein, sixteen parts, alkali, preferably pure (caustic soda) one-half to one and one-half parts, infusible oxid, free from acidity or alkalinity, preferably oxid of magnesia, two parts, water substantially thirty-six parts as described.

Woodstock, February 5, 1902.

JOHN T. SLOUGH.

Witnesses:
FRANCIS R. BALL,
R. N. BALL.